United States Patent
Chiang et al.

(10) Patent No.: US 10,250,325 B2
(45) Date of Patent: Apr. 2, 2019

(54) NETWORK SWITCHING SYSTEM

(71) Applicant: IPSecures Corporation, Taipei (TW)

(72) Inventors: Hung-Hsiang Chiang, Kaohsiung (TW); Chen-Jie Jhu, Taipei (TW)

(73) Assignee: IPSECURES CORPORATION, Taipei (TW)

( * ) Notice: Subject to any disclaimer, the term of this patent is extended or adjusted under 35 U.S.C. 154(b) by 0 days.

(21) Appl. No.: 16/102,218

(22) Filed: Aug. 13, 2018

(65) Prior Publication Data

US 2019/0052355 A1    Feb. 14, 2019

(30) Foreign Application Priority Data

Aug. 14, 2017 (TW) .............................. 106127514 A

(51) Int. Cl.
| | |
|---|---|
| *H04B 10/00* | (2013.01) |
| *H04B 10/077* | (2013.01) |
| *H04Q 11/00* | (2006.01) |
| *H04J 14/00* | (2006.01) |

(52) U.S. Cl.
CPC ..... *H04B 10/0773* (2013.01); *H04Q 11/0062* (2013.01); *H04Q 2011/0083* (2013.01)

(58) Field of Classification Search
CPC ..... H04Q 1/20; H04Q 3/0075; H04Q 3/54591
See application file for complete search history.

(56) References Cited

U.S. PATENT DOCUMENTS

| | | | |
|---|---|---|---|
| 2005/0193249 A1* | 9/2005 | Poustchi | H04M 7/006 714/13 |
| 2008/0316013 A1* | 12/2008 | Soderkvist | G05B 23/0251 340/501 |
| 2009/0010397 A1* | 1/2009 | Stanze | H04Q 3/0075 379/9.03 |
| 2010/0100768 A1* | 4/2010 | Yamamoto | H04L 41/044 714/32 |

* cited by examiner

*Primary Examiner* — Daniel G Dobson
(74) *Attorney, Agent, or Firm* — Chun-Ming Shih

(57) ABSTRACT

A network switching system is used for monitoring an operation status of an in-line device, including an operating voltage of a hardware unit of the in-line device, an operating system running in the in-line device and at least one application running in the operating system. Once an abnormal status is detected in any of the operating voltage of the hardware unit, the operating system and the application, the network switching system switches a working mode of the in-line device from a normal mode to a bypass mode, to ensure normal communication between first and second network devices connected to the in-line device.

9 Claims, 2 Drawing Sheets

NETWORK SWITCHING SYSTEM

CROSS-REFERENCE TO RELATED APPLICATIONS

This application claims the priority of Republic of China Patent Application No. 106127514 filed on Aug. 14, 2017, in the State Intellectual Property Office of the R.O.C., the disclosure of which is incorporated herein by reference.

BACKGROUND OF THE INVENTION

Field of the Invention

The invention relates to optical communication network technologies, and more particularly, to a network switching system.

Descriptions of the Related Art

In-line device is commonly used between two or more network devices. It allows associated applications in the in-line device to analyze network packets when all the network devices connected to the in-line device communicate with each other by transmitting the network packets. This is to filter the network packets to remove threatening network packets and forward secure network packets to a target network device according to the analysis result so as to ensure communication security between the network devices.

The in-line device protects communication security between the network devices as described above. However, when the in-line device does not function properly, for example, an abnormal situation (its power goes off or it goes down) occurs, the network devices connected to the in-line device lose network connection.

Accordingly, a common in-line device is usually provided with a bypass mode. The bypass mode involves a physical link based protection technique. Physical link normally includes two working statuses: normal mode and bypass mode. The bypass mode allows the network devices connected to the in-line device to be directly physically turned on under a specific trigger status and without the need of any associated system of the in-line device. The bypass mode works when the in-line device malfunctions, so as to assure that the network devices connected to the in-line device communicate with each other properly.

In the current technology, most in-line devices automatically switch to the bypass mode only when their power goes off or they go down. Practically, an abnormal situation encountered by an in-line device making it fail to provide normal network connection for the network devices connected to the in-line device however is not limited to the above two cases: power off or down, but can be caused by many reasons. What often happens is that, when the in-line device has an abnormal situation other than power off or down, it does not automatically switch to the bypass mode, thereby leading to abnormal communication between the network devices connected to the in-line device.

In view of this, how to provide a network switching control mechanism, improve the abnormal monitoring effect of the in-line device, and ensure normal communication between the network devices is the technical problem to be solved by the present invention.

SUMMARY OF THE INVENTION

In view of the above drawbacks in the conventional technology, a primary object of the invention is to provide a network switching system. It allows a working mode of an in-line device to be switched if an abnormal status is detected in any of an operating voltage, an operating system and an application of the in-line device, so as to ensure normal communication between all network devices connected to the in-line device.

According to another purpose of the invention, a network switching system of the invention is integrated in an external circuit board, thereby reducing device size and fabrication costs thereof.

To achieve the above and other objects, a network switching system applied to an in-line device is provided in the invention. The in-line device including a hardware unit built in the in-line device, an operating system running in the in-line device and at least one application running in the operating system, the in-line device being connected to a switch, the switch further being connected to a first network device and a second network device respectively to switch network channels between the first and second network devices, the network switching system including: a first detector for detecting an operating voltage of the hardware unit and for outputting a first trigger signal when it detects that the operating voltage of the hardware unit is abnormal; a second detector for detecting an operating status of the operating system and for outputting a second trigger signal when it detects that the operating status of the operating system is abnormal; a third detector including a monitoring program running in the operating system, for detecting an operating status of the application, wherein when it detects that the operating status of the application is abnormal, the third detector outputs a third trigger signal; and a controller connected to the switch, wherein the switch is in a normal mode by default, making the first and second network devices communicate with each other through the in-line device, and wherein when the controller receives any of the first, second and third trigger signals, it controls the switch to switch from the normal mode to a bypass mode, allowing the first and second network devices to communicate without the in-line device so as to ensure normal communication between the first and second network devices when the in-line device operates abnormally.

Preferably, in the network switching system said above, the first detector, the second detector and the controller are provided in an external circuit board, and the external circuit board includes a communication interface for communication connection with the in-line device.

Preferably, in the network switching system said above, the communication interface is PCIE interface.

Preferably, in the network switching system said above, the first detector outputs the first trigger signal when it detects that a supply voltage of the hardware unit is lower than a predetermined voltage threshold.

Preferably, in the network switching system said above, the second detector further includes a trigger unit for performing a timing operation, wherein when the operating system operates normally, it periodically sends a reset signal to the trigger unit, wherein the trigger unit detects if the reset signal from the operating system is received within trigger threshold time, and if the reset signal is not received within the trigger threshold time, the second trigger signal is outputted.

Preferably, in the network switching system said above, the trigger unit is a watch dog timer (WDT).

Preferably, in the network switching system said above, the controller is MCU.

Preferably, in the network switching system said above, the in-line device further includes at least one inspection program running in the operating system, and the monitoring program detects if the operating status of the application is abnormal according to an execution status of the inspection program.

Preferably, in the network switching system said above, the inspection program is for performing a network management inspection task and a data packet exchange inspection task, wherein the network management inspection task is for inspecting if the application is abnormal for network management, and the data packet exchange inspection task is for inspecting if the application is abnormal for data packet exchange.

In comparison to prior arts, the network switching system of the invention is respectively detecting the operating voltage of the hardware unit of the in-line device, the operating system running in the in-line device and the application running in the operating system. When the abnormal operating situation is detected in any of the above three, the network switching system controls the in-line device to switch from the normal mode to the bypass mode, so as to ensure normal communication between the network devices connected to the in-line device.

Moreover, the network switching system of the invention is integrated in the external circuit board (such as PCIE card) and is plugged into a communication interface of the in-line device to detect any abnormal operating situation of the in-line device, such that it can be widely used and has advantages of small device size and low costs.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
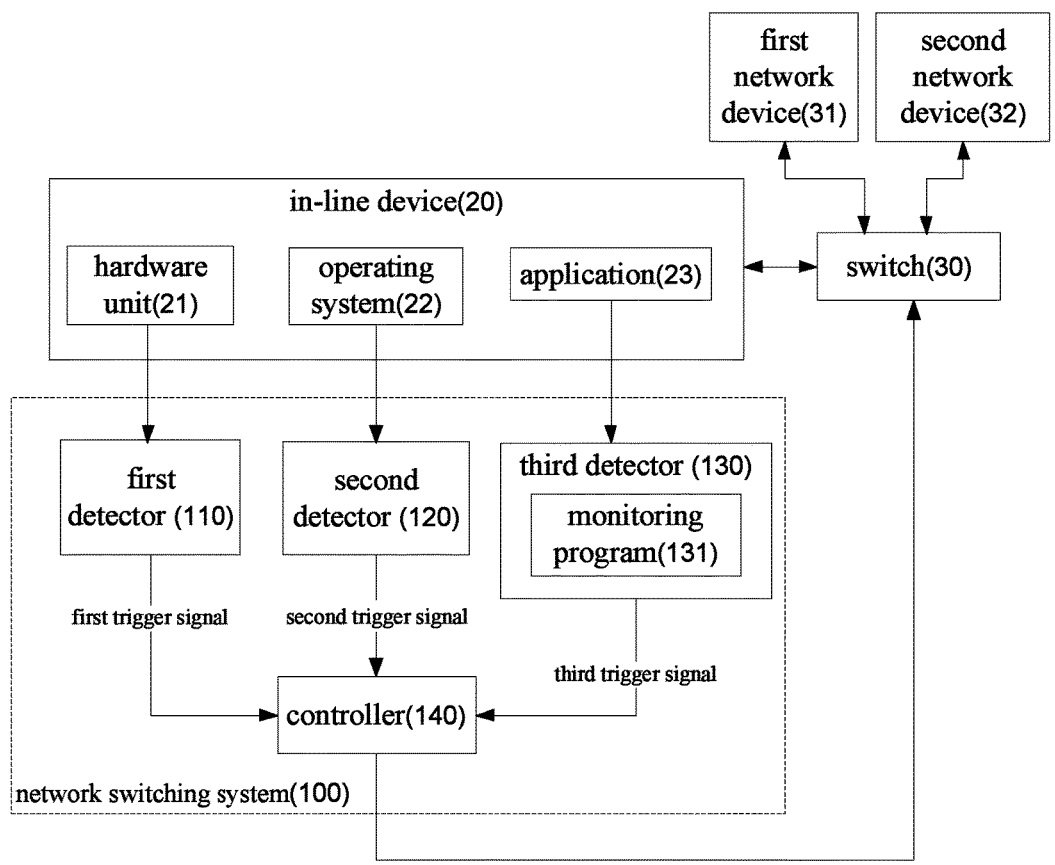
FIG. 1 is an architectural diagram of a network switching system according to a first embodiment of the invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

FIG. 1 is an architectural diagram of a network switching system according to a first embodiment of the invention. In this embodiment, the network switching system 100 is applied to an in-line device 20. The in-line device 20 includes a hardware unit 21 (such as motherboard) built in the in-line device 20, an operating system (OS) 22 running in the in-line device 20, and at least one application 23 running in the operating system 22.

The in-line device 20 is further connected to a switch 30, and there are a first network device 31 and a second network device 32 respectively connected to the switch 30, wherein the switch 30 is used to switch network channels between the first and second network devices 31, 32. It should be noted that, the number of the first and second network devices 31, 32 connected to the switch 30 can be adjusted flexibly according to practical requirements.

Referring to FIG. 1, the network switching system 100 in this embodiment includes a first detector 110, a second detector 120, a third detector 130 and a controller 140.

The first detector 110 is used to detect an operating voltage of the hardware unit 21 and to output a first trigger signal when it detects that the operating voltage of the hardware unit 21 is abnormal. The first detector 110 detects if a current operating voltage of the hardware unit 21 is lower than a predetermined voltage threshold, and decides to output the first trigger signal when the current operating voltage of the hardware unit 21 is abnormal as being lower than the predetermined voltage threshold. In this embodiment, providing that the hardware unit 21 detected by the first detector 110 is a motherboard (not shown) of the in-line device 20, the predetermined voltage threshold is 11.2V, and a normal operating voltage of the motherboard is for example 12V, the first detector 110 would output the first trigger signal when it detects that the operating voltage of the motherboard drops from 12V to lower than 11.2V.

The second detector 120 is used to detect an operating status of the operating system 22 of the in-line device 20 and to output a second trigger signal when it detects that the operating status of the operating system 22 is abnormal. In this embodiment, the second detector 120 detects if kernel of the operating system 22 crashes so as to accordingly determine if operation of the operating system 22 is abnormal.

The third detector 130 includes a monitoring program 131 stored therein which runs in the operating system 22 of the in-line device 20. The third detector 130 utilizes the monitoring program 131 to detect an operating status of an associated application 23 installed in the operating system 22, and outputs a third trigger signal when it detects that the operating status of the application 23 is abnormal. It should be noted that, the number and type of the application 23 monitored by the monitoring program 131 are preset by the factory or can be set by a user of the in-line device 20 according to practical requirements. The application 23 is selectively used for bandwidth management, packet inspection, hacking prevention and ring network device management.

The controller 140 is connected to the switch 30. The switch 30 is in a normal mode by default, and thus the first and second network devices 31, 32 communicate with each other through the in-line device 20. When the controller 140 receives any of the first, second and third trigger signals, it controls the switch 30 to switch from the normal mode to a bypass mode, allowing the first and second network devices 31, 32 to communicate without the in-line device 20, so as to ensure normal communication between the first and second network devices 31, 32 if the in-line device 20 operates abnormally.

Particularly, when the in-line device 20 functions properly, the switch 30 is in the normal mode, it means that the first and second network devices 31, 32 connected to the switch 30 communicate with each other through the in-line device 20 that provides communication security between the first and second network devices 31, 32. When the controller 140 receives the first, second or third trigger signal, it means that the network switching system 100 detects an abnormal operating status in any of the operating voltage of the hardware unit 21 in the in-line device 20, the operating system 22 running in the in-line device 20 and the application 23 running in the operating system 22. As such abnormal operating status causes interruption of network communication between the first and second network devices 31, 32, the controller 140 controls the switch 130 to switch from the normal mode to the bypass mode, such that the first and second network devices 31, 32 may communicate without the in-line device 20, thereby preventing communication interruption of the first and second network devices 31, 32 caused by abnormal operation of the in-line device 20.

Figure 2:
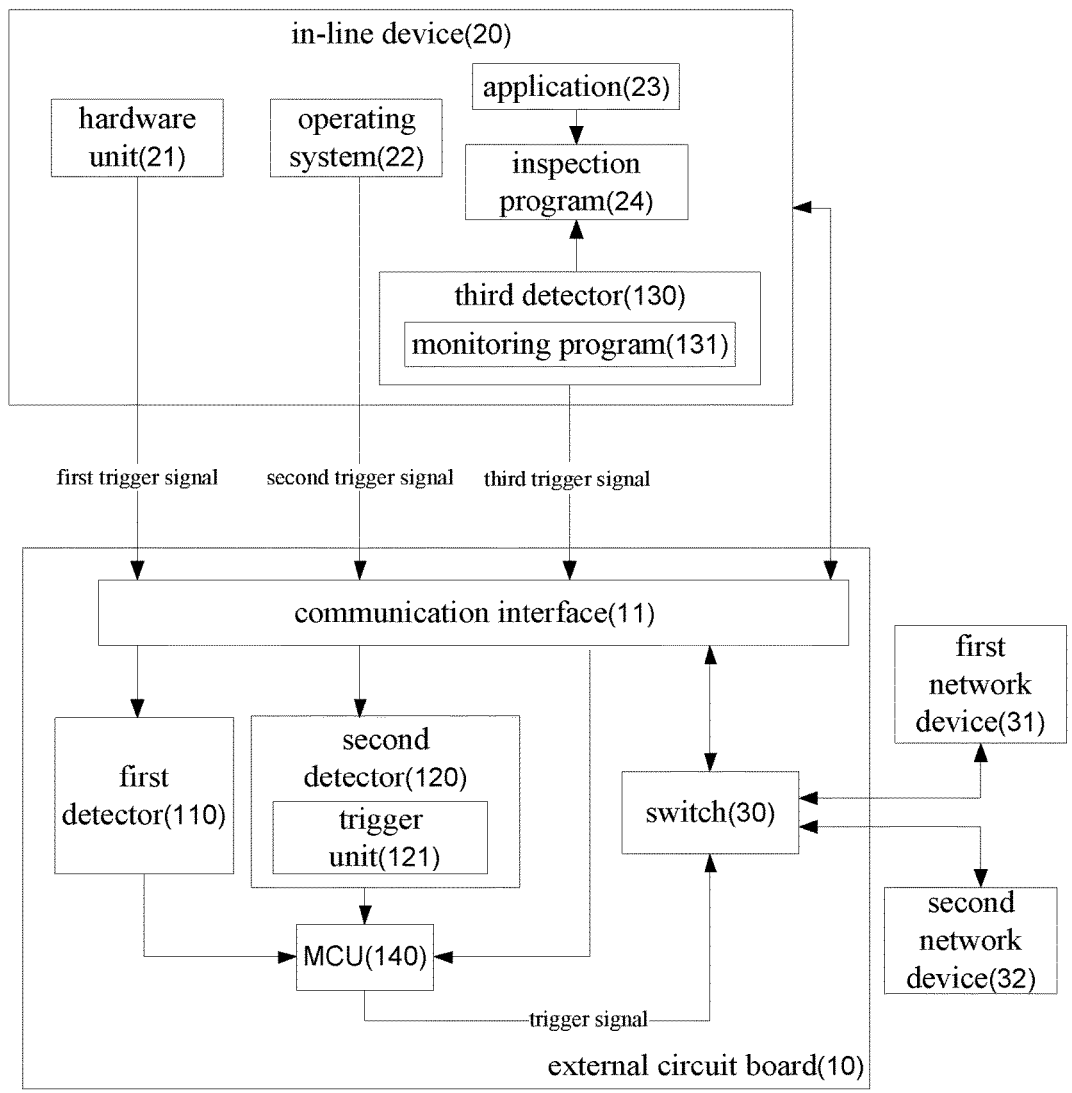
FIG. 2 is an architectural diagram of the network switching system according to a second embodiment of the invention.

FIG. 2 is an architectural diagram of the network switching system 100 according to a second embodiment of the invention. In the network switching system 100 of the second embodiment, its software part, that is, the monitoring program 131 of the third detector 130, is provided in the in-line device 20, while its hardware part, including the first and second detectors 110, 120 and the controller 140, is provided in an external circuit board 10, wherein the external circuit board 10 includes a communication interface 11 for communication connection with the in-line device 20. The in-line device 20 further includes a PCIE interface (not shown), and the external circuit board 10 is for example a PCIE add-on card having a PCIE communication interface, which can be plugged into the PCIE interface of the in-line device 20 to be electrically connected to the in-line device 20, such that the in-line device 20 may provide power for each hardware unit in the external circuit board 10. Moreover, the switch 30 for controlling the working mode of the in-line device 20 is also integrated in the external circuit board 10.

The controller 140 is for example MCU 140. In this embodiment, the motherboard of the in-line device 20 follows standard ATX power supply sequencing control. When the in-line device 20 performs a power-on operation, the order of power supply sequencing includes: when not powered on (waiting for power-on), the motherboard of the in-line device 20 only has 3.3 AUX standby voltage; after pressing a power button of the in-line device 20, the in-line device 20 performs the power-on operation, and 12V and 3.3V voltages are generated in the motherboard. When the in-line device 20 performs a shutdown operation, the order of power supply sequencing is just the opposite, wherein the motherboard drops from its normal operating voltage 12V to 3.3V, and until the in-line device 20 completes the shutdown operation, the motherboard only has 3.3 AUX standby voltage. As the operating voltage of MCU is supplied by 3.3 AUX, before the in-line device 20 performs the power-on operation, MCU 140 may start working, while when the in-line device 20 is powered off (shut down), MCU 140 is also the last hardware unit that stops working. Accordingly, when the first detector 110 detects that the operating voltage of the motherboard of the in-line device 20 drops abnormally, for example from 12V to 11.2V, it outputs the first trigger signal to MCU 140 that may still operate normally under such operating voltage, such that MCU 140 can allow the switch 30 to switch from the normal mode to the bypass mode successfully before the motherboard's voltage drops to the final 3.3 AUX, thereby ensuring normal communication between the first and second network devices 31, 32.

It should be noted that the hardware unit 21 detected by the first detector 110 is not limited to the above motherboard, but can be any other hardware unit in the in-line device 20 according to practical requirements. For example, the first detector 110 may detect if the operating voltage of the PCIE interface of the in-line device 20 is normal so as to determine if the working mode of the in-line device 20 should switch to the bypass mode.

Further referring to FIG. 2, in this embodiment, the second detector 120 also includes a trigger unit 121 for detecting if the kernel of the operating system 22 of the in-line device 20 crashes during a timing operation. Particularly, when the operating system 22 functions normally, it periodically sends a reset signal to the trigger unit 121. The trigger unit 121 detects if the reset signal from the operating system 22 is received within trigger threshold time. If the reset signal is not received within the trigger threshold time, the second trigger signal is outputted.

In this embodiment, the trigger unit 121 is a watch dog timer (WDT) for performing the timing operation and generating timing time. When the operating system 22 functions normally, it periodically sends the reset signal to the trigger unit 121, making the trigger unit 121 clear currently generated timing time and restart timing. When currently generated timing time exceeds the trigger threshold time, it means the operating system 22 does not periodically output the reset signal, such that the second detector 120 may accordingly decide that the operating system 22 operates abnormally (that is, the kernel of the operating system 22 crashes) and output the second trigger signal.

In another embodiment of the invention, the in-line device 20 further includes at least one inspection program 24 running in the operating system 22, for inspecting an operating status of each application 23 running in the in-line device 20. The monitoring program 131 of the invention thus may indirectly detect if the operating status of the application 23 is abnormal according to an execution status of the inspection program 24.

Particularly, the inspection program 24 is provided by a supplier of the in-line device 20 or application 23, and is used to perform a network management inspection task and a data packet exchange inspection task, wherein the network management inspection task is for inspecting if the application 23 is abnormal for network management, and the data packet exchange inspection task is for inspecting if the application 23 is abnormal for data packet exchange. For example, the network management task includes performing SNMP traps and requests, and the data packet exchange inspection task includes performing load-balancing algorithm. In this embodiment, the monitoring program 131 may directly work with the inspection program 24 of the in-line device 20 to determine if the application 23 runs abnormally according to the inspection result from the inspection program 24. Using the existing inspection program 24 in the in-line device 20 to monitor the operating status of the application 23 not only reduces costs on developing monitoring programs for monitoring operation of the application 23, but also further reduces the overall fabrication costs of the invention.

Therefore, when any of the operating voltage of the in-line device, the operating system running in the in-line device and the application running in the operating system encounters an abnormal operating situation, it would cause communication interruption between all network devices connected to the in-line device. The network switching system of the invention is provided with the first, second and third detectors for respectively detecting the operating voltage of the hardware unit of the in-line device, the operating system running in the in-line device and the application running in the operating system. When the abnormal operating situation is detected in any of the above three, the network switching system controls the in-line device to switch from the normal mode to the bypass mode, so as to ensure normal communication between the network devices connected to the in-line device.

Moreover, the network switching system of the invention, except its software, is integrated in the external circuit board, and the external circuit board is plugged into the communication interface of the in-line device to monitor an operating status of each part of the in-line device. Thus, the invention is applicable to various in-line devices, has a wide application range, and has advantages of small device size and low fabrication costs.

The examples above are only illustrative to explain principles and effects of the invention, but not to limit the invention. It will be apparent to those skilled in the art that modifications and variations can be made without departing from the scope of the invention. Therefore, the protection range of the rights of the invention should be as defined by the appended claims.

What is claimed is:

1. A network switching system applied to an in-line device, the in-line device including a hardware unit built in the in-line device, an operating system running in the in-line device and at least one application running in the operating system, the in-line device being connected to a switch, the switch further being connected to a first network device and a second network device respectively to switch network channels between the first and second network devices, the network switching system including:
   a first detector for detecting an operating voltage of the hardware unit and for outputting a first trigger signal when it detects that the operating voltage of the hardware unit is abnormal;
   a second detector for detecting an operating status of the operating system and for outputting a second trigger signal when it detects that the operating status of the operating system is abnormal;
   a third detector including a monitoring program running in the operating system, for detecting an operating status of the application, wherein when it detects that the operating status of the application is abnormal, the third detector outputs a third trigger signal; and
   a controller connected to the switch, wherein the switch is in a normal mode by default, making the first and second network devices communicate with each other through the in-line device, and wherein when the controller receives any of the first, second and third trigger signals, it controls the switch to switch from the normal mode to a bypass mode, allowing the first and second network devices to communicate without the in-line device so as to ensure normal communication between the first and second network devices when the in-line device operates abnormally.

2. The network switching system according to claim 1, wherein the first detector, the second detector and the controller are provided in an external circuit board, and the external circuit board includes a communication interface for communication connection with the in-line device.

3. The network switching system according to claim 2, wherein the communication interface is PCIE interface.

4. The network switching system according to claim 1, wherein the first detector outputs the first trigger signal when it detects that a supply voltage of the hardware unit is lower than a predetermined voltage threshold.

5. The network switching system according to claim 1, wherein the second detector further includes a trigger unit for performing a timing operation, wherein when the operating system operates normally, it periodically sends a reset signal to the trigger unit, wherein the trigger unit detects if the reset signal from the operating system is received within trigger threshold time, and if the reset signal is not received within the trigger threshold time, the second trigger signal is outputted.

6. The network switching system according to claim 5, wherein the trigger unit is a watch dog timer (WDT).

7. The network switching system according to claim 1, wherein the controller is MCU.

8. The network switching system according to claim 1, wherein the in-line device further includes at least one inspection program running in the operating system, and the monitoring program detects if the operating status of the application is abnormal according to an execution status of the inspection program.

9. The network switching system according to claim 8, wherein the inspection program is for performing a network management inspection task and a data packet exchange inspection task, wherein the network management inspection task is for inspecting if the application is abnormal for network management, and the data packet exchange inspection task is for inspecting if the application is abnormal for data packet exchange.

* * * * *